(12) United States Patent
Lunner et al.

(10) Patent No.: US 8,246,716 B2
(45) Date of Patent: Aug. 21, 2012

(54) METHOD IN CONNECTION WITH STEEL PRODUCTION

(75) Inventors: Sven-Eric Lunner, Avesta (SE); Ye Guozhu, Luleå (SE)

(73) Assignee: Outokumpu Oyj, Espoo (FI)

( * ) Notice: Subject to any disclaimer, the term of this patent is extended or adjusted under 35 U.S.C. 154(b) by 69 days.

(21) Appl. No.: 12/813,444

(22) Filed: Jun. 10, 2010

(65) Prior Publication Data

US 2010/0275728 A1   Nov. 4, 2010

Related U.S. Application Data

(62) Division of application No. 10/599,477, filed as application No. PCT/SE2005/000497 on Apr. 6, 2005, now Pat. No. 7,744,674.

(30) Foreign Application Priority Data

Apr. 7, 2004 (SE) ........................ 0400937

(51) Int. Cl.
   *C21C 7/076* (2006.01)
(52) U.S. Cl. ............... 75/565; 75/309; 75/310; 75/323; 75/560; 75/569; 75/570; 75/765
(58) Field of Classification Search ............ 75/303–329, 75/10.46–10.61; 148/22–30; *C21B 3/02; C21C 7/076; C22B 9/10; C23G 1/36*
See application file for complete search history.

(56) References Cited

U.S. PATENT DOCUMENTS

| 3,044,868 | A | | 7/1962 | Francis |
| 3,276,860 | A | | 10/1966 | Lintz |
| 4,043,803 | A | | 8/1977 | Skaria et al. |
| 4,071,595 | A | | 1/1978 | Komarek et al. |
| 4,235,632 | A | * | 11/1980 | Uher et al. ............. 164/473 |
| 4,252,462 | A | | 2/1981 | Klingle |
| 4,380,469 | A | | 4/1983 | Sulzbacher |
| 5,611,838 | A | | 3/1997 | Fritz et al. |

FOREIGN PATENT DOCUMENTS

| DE | 3634106 | 4/1988 |
| JP | 58-28516 | 3/1976 |
| JP | 57079107 | 5/1982 |
| JP | 7188793 | 7/1995 |
| JP | 2003-277821 | 3/2002 |
| WO | 03018850 | 3/2003 |

OTHER PUBLICATIONS

English translation of JP 57-079107 (K. Kurachi and T. Oda), published in the Japanese language on May 18, 1982.*

* cited by examiner

*Primary Examiner* — Scott Kastler
*Assistant Examiner* — Vanessa Luk
(74) *Attorney, Agent, or Firm* — Chernoff, Vilhauer, McClung & Stenzel

(57) ABSTRACT

A method of producing a fluxing agent that can be used in production of steel, preferably stainless steel, employs as a raw material a hydroxide sludge that results from neutralization of metal-contaminated pickling liquid from a pickling step for a steel and contains at least one fluoride-containing compound. The hydroxide sludge is calcined. Steel, preferably stainless steel, is produced by decarburizing a steel heat, whereby a slag is formed on top of the steel heat, and adding a fluxing agent to the slag.

13 Claims, 2 Drawing Sheets

METHOD IN CONNECTION WITH STEEL PRODUCTION

CROSS-REFERENCE TO RELATED APPLICATION

Figure 1:
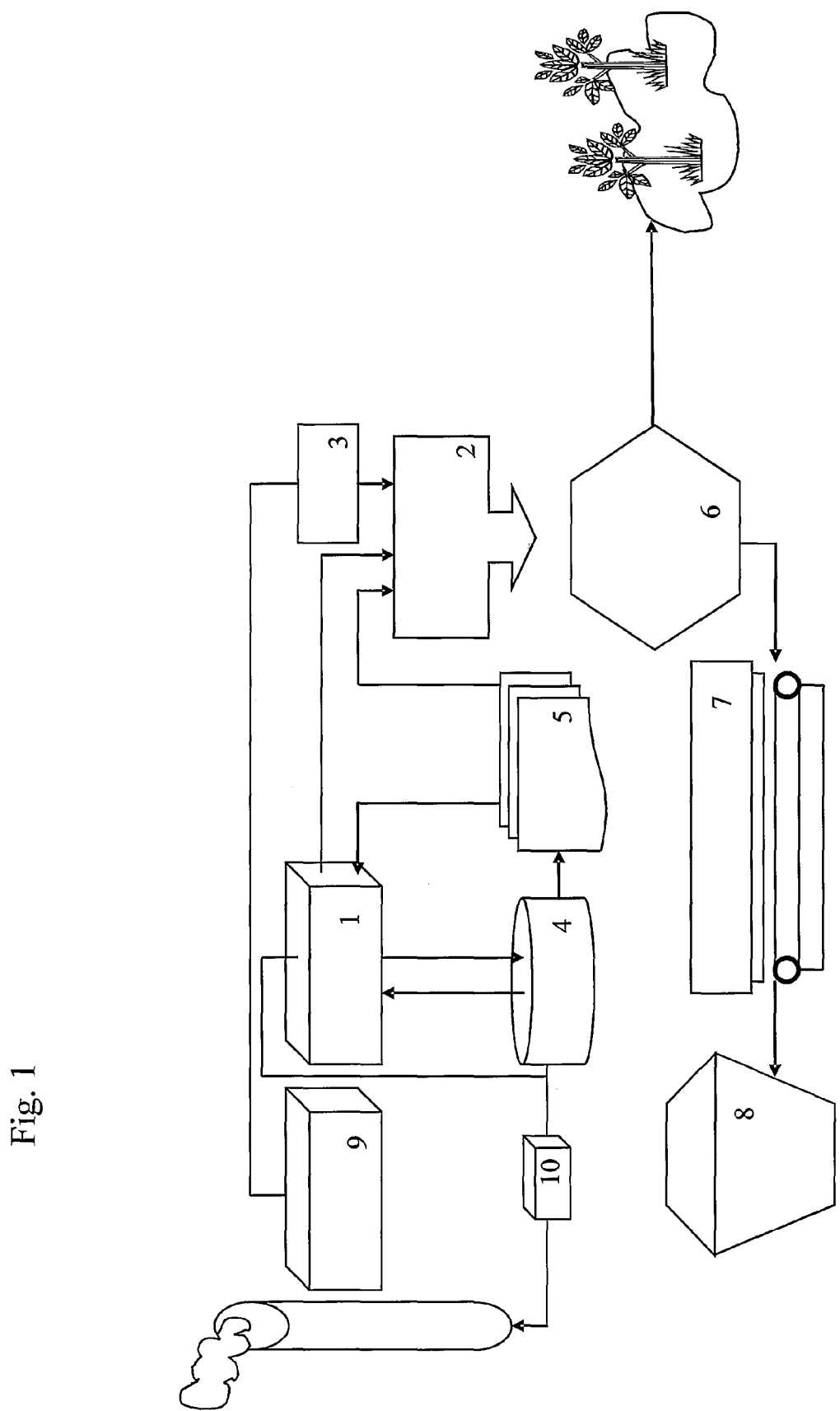

This is a divisional of co-pending patent application Ser. No. 10/599,477 filed Sep. 29, 2006, now U.S. Pat. No. 7,744,674 which is a national stage application filed under 35 USC 371 based on International Application No. PCT/SE2005/000497 filed Apr. 6, 2005, and claims priority under 35 USC 119 of Swedish Patent Application No. 0400937.9 filed Apr. 7, 2004.

TECHNICAL FIELD

The present invention relates to a method of producing a product that can be used as a fluxing agent in steel production. The invention also relates to a method in connection with steel production, preferably of a stainless steel, comprising production of a steel heat, decarburization of the steel heat whereby a slag is applied on top of said steel heat. Finally, the invention also relates to a product produced according to the invention.

PRIOR ART

The production of steel, especially stainless steel, comprises annealing and pickling processes. The annealing is a heat treatment operation that aims at recrystallizing the microstructure of the steel and making it ductile. In the annealing, an oxide layer is formed on the surface of the steel, and a chromium-depleted layer is formed directly beneath the oxide layer. Both of these two layers are removed by pickling.

Pickling means that the annealed steel product is treated by acid, most often a mixture of different acids, by which the undesired metal deposits in the surface are taken away. A mixture of nitric acid, $HNO_3$, and hydrofluoric acid, HF, is the most efficient for pickling of stainless steel. The dissolved metals form metal complexes and deposits that have to be removed from the process. Especially, it is difficult to handle spent pickling liquids that contain mixed acids, such as a mixture of nitric acid ($HNO_3$) and hydrofluoric acid (HF), containing fluorides. Also the content of e.g. iron, chromium and nickel oxides in the production of stainless steels, constitutes a handling problem.

After the pickling treatment, the steel product is flushed by water, whereby acidic flushing water is formed. The dissolved metals in the form of metal complexes and deposits, as well as the acidic flushing water, constitute waste matters of severe environmental impact, and must be subjected to special handling in order not to cause severe environmental damages. Similarly to the case in other process industries, there is also a strive within the steel industry to recover waste products and to close the cycle.

Several different methods are known to try to regenerate the free acids ($HNO_3$ and HF) of the spent pickling liquid. A technique for this, which has been used for long by the present applicant, is the acid retardation process, commonly referred to as SAR (Scanacon Acid Retardation). A SAR plant operates to keep the metal concentration in the pickling bath at a low and stable level, and consists of one mechanical and one chemical process step. The mechanical step separates the acid and the metal sludge (metal oxide, metal fluoride), in a solid phase. The chemical step separates the acid and dissolved metal ions, by aid of a resin bed. From the SAR plant, a free concentrated acid with a low metal content is recycled back to the pickling bath. In order to recover yet more free nitric acid an electro-dialysis step can be used that separates anions and cations in the acid by means of membrane technique. The separation of ions are accelerated by an electrical DC-source. The separated metal ions, together with a weak free acid, and the sludge, are pumped to the neutralizing plant for destruction.

Another technique, called the Pyromar process, makes use of thermal decomposition of metal fluoride complexes in order to recover hydrofluoric acid, nitric acid and metals. By spray-calcination, a spent pickling liquid is converted to gas phase, where after it can be converted to a reusable acid by one or more absorption columns. The metals form metal oxides and must be subjected to reduction before being used again in the melting shop. The process has several drawbacks. Large amounts of nitrous fumes ($NO_x$) are formed by the spray-calcination, and these fumes must de destroyed by e.g. selective catalytic removal control (SCR). By the formation of $NO_N$, large amounts (about 30-40%) of the nitric acid disappear, which causes an imbalance in the recovered amounts of hydrofluoric acid and nitric acid. Yet another drawback is that the metal oxides is in dust form, has a low density (0.5 g/cm$^3$), and that it contains high amounts of fluorides (>1%) that make it difficult to reduce the oxide product to a metallic form.

Yet another technique is called OPAR (Outokumpu Pickling Acid Recovery), in which sulphuric acid is used to decompose the metal fluoride complexes in the spent pickling liquid, by reacting with it and forming metal sulphates. The mixed acid of $HNO_3$ and HF, thus recovered, is separated by evaporation and condensation. The condensate is recycled back to the pickling bath, and metal sulphates formed in the process are heat treated, filter pressed and finally neutralised by calcium hydroxide and spent slag from the melting shop. The process is very costly and the neutralisation process results in a volume increase of 4-5 times, thereby generating large amounts of metal calcium sulphate and metal hydroxide sludge that has to be dumped. No technique for recycling metal oxides and sulphuric acid exists today.

In the neutralisation plant, the spent pickling liquid is neutralised by calcium hydroxide, $Ca(OH)_2$, whereby a sludge results that consists of different metal hydroxides $Me(OH)_x$, calcium fluoride ($CaF_2$) and calcium sulphate ($CaSO_4$). Today, such sludge is dumped.

In case of rain, there is a risk that some metals are leached out from the landfill, which means that the leaching water has to be handled and returned to the neutralisation plant.

During recent years, more stringent environmental demands have among other things led to stronger demands on landfill designs, which has resulted in highly elevated costs. Furthermore, a landfill tax may be introduced in the future. This has led to commenced investigations considering the possibility to keep down the amount of dumped sludge.

In Swedish patent no. SE 519776 of the present applicant, a method of reutilising metal-containing hydroxide sludge from a pickling step, is disclosed. The hydroxide sludge is mixed with an admixture having a content of a substance in group 14 of the periodic table, and is allowed to solidify by hardening or polymerisation, whereby the water content sinks to below 15%. The solidified mixture may then be recycled to a steel heat in connection with steel production in an arc furnace. The method also allows for powdery or finely dispersed residual products comprising metals, metal oxides and metal hydroxides, to be recycled to the steel manufacturing. It is also shown that the metals in the product go into the steel heat, that carbon leaves as carbon dioxide, water as water vapour (in small amounts), and that silicon, oxides, fluorides etc. go into the slag. The drawbacks of the method are that fluorides wear on the arc furnace lining, and that water must be driven off which increases the processing time in the arc furnace.

It is known from DE 36 34 106 to use a pickling agent distillation residue containing metal salts, such as a fluoride-containing component, in the production of a slag-forming additive for steel production. Also, a method for production of the slag-forming additive is described, which comprises distillation of the pickling liquid in order to drive off the free acids nitric acid and hydrofluoric acid, and to crystallize metal fluorides as moist sludge. Thereafter, the sludge is filtered in order to remove additional water and acid, and the dewatered sludge is mixed with caustic lime, CaO. This mixture can be added to a steel heat as a slag-forming additive. The slag-former will be relatively porous, which makes it difficult to handle. Any remaining moist may also cause steam explosions, and gaseous components will give increased $NO_x$ emissions constituting a load on the gas cleaning plant of the steel works. Other drawbacks of the method are that the distillation process is costly, and that it is difficult to recycle the nitric acid. About 40% of the nitric acid leaves together with the steam that is driven off, and this nitric acid must be destroyed in the SCR in the gas cleaning plant.

BRIEF ACCOUNT OF THE INVENTION

The invention relates to the handling of hydroxide sludge formed in the neutralisation of spent metal-contaminated pickling agents from a pickling step for steel, preferably stainless steel. The controversial idea forms the basis of the invention, that instead of previously focusing on recovery of the metals of the hydroxide sludge, now focusing on the calcium fluoride content, and considering this calcium fluoride to be a resource instead of a load. The present applicant has striven to find a method that enables handling of the calcium fluoride in the hydroxide sludge, in order to use it as a replacement for natural fluorspar (commonly called flux) as a fluxing agent. This is achieved by a method of producing a fluxing agent that can be used in production of steel, preferably stainless steel, characterised in that as a raw material for the production of said fluxing agent is used a hydroxide sludge resulting from neutralisation of metal-contaminated pickling liquid from a pickling step for a steel, said hydroxide sludge containing at least one fluoride-containing compound, and that said hydroxide sludge is calcined. The invention also provides a method in connection with steel production, preferably stainless steel, comprising production of a steel heat and decarburization of the steel heat, whereby a slag is formed on top of said steel heat, characterised in that a product according to the invention is added to said slag. Preferably, the product is added to the slag in an amount that partly or totally corresponds to the requirement of $CaF_2$ in order to achieve a desired fluxing effect.

By the invention, it is also possible to achieve one or some of the following advantages:
  hydroxide sludge can be recycled to the steel production essentially without any process drawbacks
  hydroxide sludge can be recycled to the steel production essentially without any health hazards to the personnel
  the metals in the hydroxide sludge can be recovered
  hydroxide sludge may replace natural fluorspar essentially without impairing the properties of the produced steel
  hydroxide sludge already dumped and originating from acidic, metal-contaminated pickling liquids, can be taken care of
  hydroxide sludge can be processed into a mechanically stable product that may constitute a fluxing agent
  a fluxing agent can be produced by a method that in its essentials is simple and cost-efficient
  a fluxing agent can be produced essentially without health hazards for the personnel The invention has been developed primarily for use in connection with the production of stainless steels, but it can also be used in connection with other types of steel production, such as production of carbon steel.

BRIEF DESCRIPTION OF THE ACCOMPANYING DRAWINGS

Figure 2:
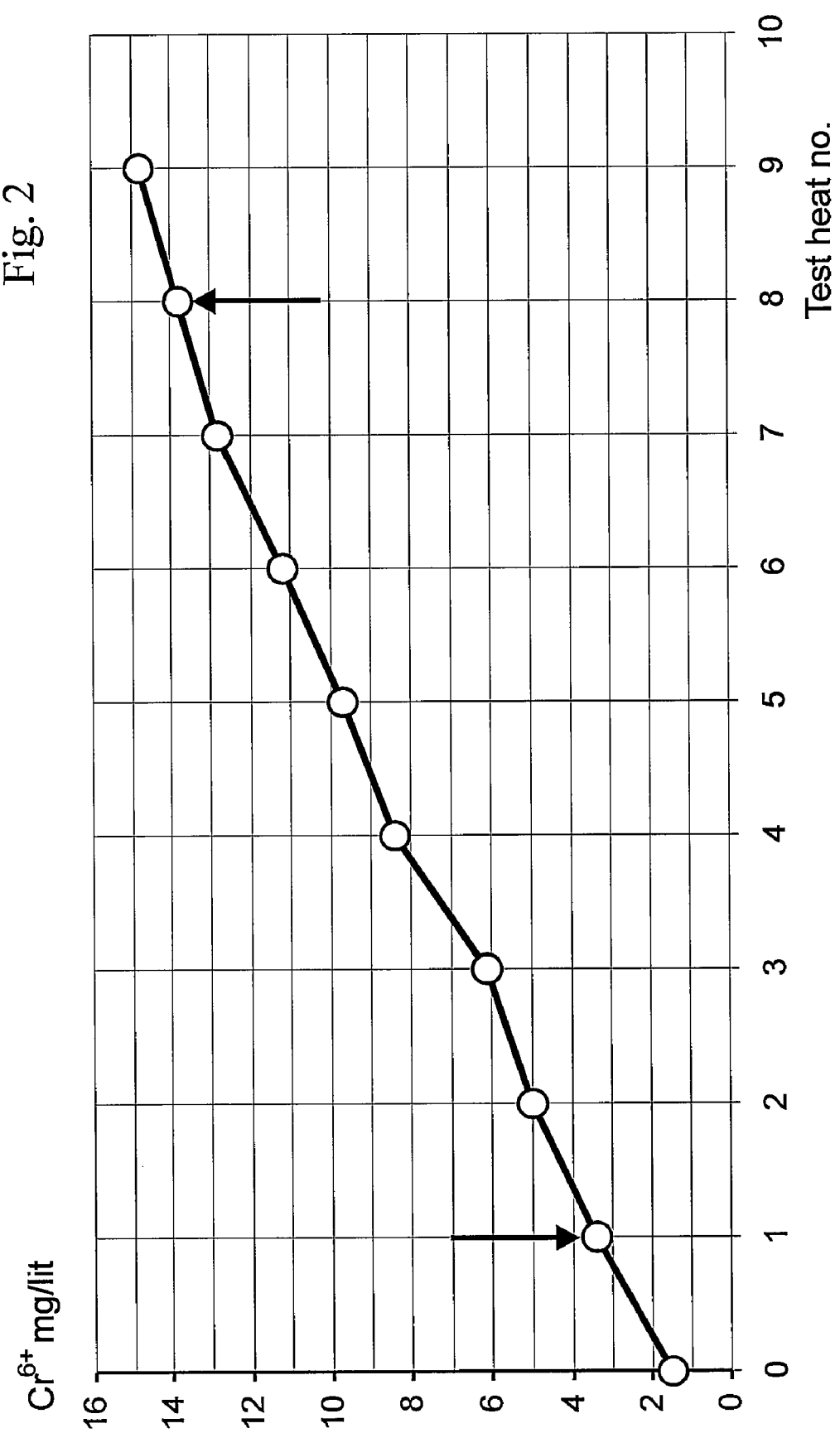

FIG. 1 is a flowsheet for the process,
FIG. 2 shows a graph over the contents of $Cr^{6+}$ in an exhaust emission control plant.

DETAILED DESCRIPTION OF THE INVENTION

The inventive process is described below with reference to the flowsheet in FIG. 1.

Acidic, metal-contaminated and spent pickling liquids that can be handled according to the invention are chemically acidic pickling liquids 1 as well as neutral pickling liquids for electrolytic pickling. Such spent pickling liquids comprise residual acids, such as hydrofluoric acid, nitric acid, sulphuric acid, salts of such acids, including sodium sulphate e.g., and dissolved metal fluorides and metal oxides. In connection with the method, a per se known neutralisation 2 of the spent pickling liquid is performed to a pH of about 9-10, by addition of alkali, usually milk of lime, $Ca(OH)_2$, but also other alkaline additives may be used, for example $CaCO_3$, NaOH. Prior to the neutralisation chromium reduction of the liquid from the neolyte pickling step 9 (pH 6-6.5) may take place 3. Regeneration of free acids in the pickling acids is performed in a SAR-step 4 and electro-dialysis step 5. Reduction of nitrous fumes ($NO_x$) can be obtained by selective catalytic removal control (SCR) or hydrogen peroxide treatment 10.

After the neutralisation, the neutralised pickling liquid is dewatered 6, suitably mechanically in a filter press e.g., to a dry substance content of at least 30% by weight, preferably at least 50% by weight and up to 80% by weight, but normally not more than up to 70% by weight. Effluent water containing some nitrates ($Ca(NO_3)_2$, pH 9-10) can be led to the recipient.

The dewatered product is called hydroxide sludge. The hydroxide sludge contains e.g. $CaF_2$, $CaSO_4$ and Fe-, Cr-, Ni-hydroxides and Ca- or Fe-molybdate, at least in the case that hydrofluoric acid is used in the pickling liquid and in the case of stainless steel production. The hydroxide sludge is dried and calcined or sintered 7 to a mechanical stable product before it is added as a fluxing agent in the AOD-converter 8 in the steel production.

With the purpose of finding suitable methods for treatment of the hydroxide sludge, extensive experiments have been conducted in order to obtain a product capable of constituting a fluxing agent.

Undertaken Experiments

Introductory experiments for the treatment of hydroxide sludge have comprised:
  calcination and melting in a 3 kg Tamman furnace (>1500° C.),
  melting in a 20 kg rotating furnace,
  calcination in a small scale Kanthal furnace (1100° C.),
  calcination in a bell-type furnace, 500 kg/heat,
  calcination in a pilot scale Kaldo converter (6 tons), by aid of a LPG burner, drying in a drying chamber (200° C.),
treatment in a pilot scale DC furnace (10 tons and 3 MW).

Of these experiments, it is the calcination experiments in an electrically heated, stationary bell-type furnace and the calcination experiments in an LPG heated, rotating Kaldo converter that will be described further. By these experiments, a well sintered, mechanically stable and dustless product has been achieved, which product has then been used in subsequent experiments for evaluation of the properties of the calcined sludge as a fluxing agent in a converter instead of or in combination with regular fluorspar.

In a preferred embodiment of the invention, an electrically heated, stationary furnace (of bell-type) is used for the calcination of hydroxide sludge. From the description below, it is evident that this results in a product having very good properties in terms of mechanical stability, sintering degree and piece/particle size, but according to undertaken pilot experiments, a Kaldo converter can also be used for the calcination. Furthermore, undertaken experiments of calcining in a rotary kiln have shown to give a stable product. These experiments will not be described further since the hydroxide sludge had an exceptional high moisture content of 55-60% which resulted in abnormal problems during the calcining. However, one conclusion from the experiment is that the fines fraction is likely to be reduced if the moisture content in the hydroxide sludge and the rotating speed of the rotary kiln are sufficiently low.

The process for calcination of hydroxide sludge in a stationary furnace (bell-type) or rotary kiln which is electrically heated or heated by LP-gas or oil, can be described according to the following:
  heating to 150-200° C., evaporation of free water in the sludge
  heating to 600-900° C., evaporation of crystal water, whereby the material becomes completely dehydrated
  heating to 1000-1200° C., sintering to a mechanically stable product (hydroflux)

The process for calcination of hydroxide sludge in a converter (Kaldo converter type) which is LPG heated, can be described according to the following:
a) heating to 150-200° C., evaporation of free water in the hydroxide sludge
b) heating to 600-900° C., chemically bonded water leaves
c) heating to 1200-1300° C., the hydroxide sludge melts
d) discharging the molten hydroxide sludge from the furnace to cool down to ambient temperature during solidification to form a mechanically stable product (hydroflux)
e) crushing of the solidified hydroflux product Pilot Experiments For the calcination was used 10 tons of hydroxide sludge having a relatively high sulphur content, and 2 tons of hydroxide sludge having a relatively low sulphur content. The high sulphur content hydroxide sludge was split into 3 portions that were calcined in a Kaldo converter after first having been dried in a chamber furnace at 200° C. Portions 1 and 2 were heated to 900° C. in the Kaldo converter, and portion 3 was melted in the Kaldo converter. The low sulphur content hydroxide sludge was split into two portions, whereof one portion, portion no. 4, was dried in a chamber furnace according to the above, and the other portion, portion no. 5, was air dried at ambient temperature. These two low sulphur content portions were calcined in a bell-type furnace.

The average composition of the two categories of hydroxide sludge at 85% dry content, i.e. after drying at 110° C. but before calcination, are shown in the table below.

TABLE 1

| CATEGORY | Fe(OH)$_3$ | Cr(OH)$_3$ | Ni(OH)$_2$ | MoO$_3$ | CaF$_2$ | CaSO$_4$ | C | Na$_2$O | CaO |
|---|---|---|---|---|---|---|---|---|---|
| High sulphur content | 23.4 | 10.4 | 3.2 | 0.3 | 44.2 | 3.2 | 0.95 | 0.1 | 9.2 |
| Low sulphur content | 24.1 | 5.1 | 3.6 | 0.3 | 43.6 | 0.3 | 0.5 | 0 | 8.5 |

In the table below, properties and amounts of the calcined hydroxide sludge that was obtained, and the temperature during calcination for the respective portions, are shown.

TABLE 2

| PORTION | WEIGHT (KG) | TEMPERATURE (° C.) | PROPERTIES |
|---|---|---|---|
| 1 | Totally 1850 | 900 | small, loosely sintered lumps, 10-20 mm, of poor strength |
| 2 | | | |
| 3 | 450 | 1300 | Hard, molten lumps, must be crushed before use |
| 4 | Totally 670 | 1000-1100 | Hard, sintered lumps having a size of 10-40 mm |
| 5 | | | |

During calcination, the carbon content was decreased by carbon leaving as carbon dioxide. The carbon originates from calcium carbonate that accompanies the lime in the neutralisation process. The materials from portions no. 1 and 2 were agglomerated, but had a very poor strength and small size. The material from portion no. 3 was very much similar to natural fluorspar, in respect of strength and size.

During calcination in the bell-type furnace, it was noted that the carbon content was low to even in this case. The material from portions no. 4 and 5 had very good strength properties, in practice equally good as the molten material from portion no. 3.

The materials from portions no. 1 and 2 were judged unsuitable for continued experiments, due to the risk of dusting and due to poor strength. The materials from portions no. 3, 4 and 5 had none or a very small ratio of fines fraction, and were judged suitable to be used in subsequent experiments. The composition of these materials is shown in the table below (% by weight):

TABLE 3

| PORTION | Fe$_2$O$_3$ | Cr$_2$O$_3$ | NiO | MoO$_3$ | CaF$_2$ | CaSO$_4$ | C | Na$_2$O | CaO | SiO$_2$ | MgO |
|---|---|---|---|---|---|---|---|---|---|---|---|
| 1 | 25.2 | 11.8 | 3.1 | 0.3 | 47.8 | 3.0 | 0.01 | 0.1 | 7.1 | 1.8 | 0.6 |
| 2 | 25.4 | 11.6 | 3.0 | 0.2 | 47.6 | 2.9 | 0.01 | 0.1 | 7.3 | 1.9 | 0.6 |
| 3 | 25.3 | 11.7 | 3.0 | 0.2 | 41.0 | 2.8 | 0.01 | 0.1 | 14*) | 2.0 | 0.5 |

TABLE 3-continued

| PORTION | $Fe_2O_3$ | $Cr_2O_3$ | NiO | $MoO_3$ | $CaF_2$ | $CaSO_4$ | C | $Na_2O$ | CaO | $SiO_2$ | MgO |
|---|---|---|---|---|---|---|---|---|---|---|---|
| 4 | 27.9 | 6.1 | 3.4 | 0.3 | 51.5 | 0.4 | 0.02 | 0 | 10.5 | 1.9 | 0.4 |
| 5 | 27.6 | 5.9 | 3.5 | 0.2 | 51.2 | 0.4 | 0.02 | 0 | 10.8 | 2.1 | 0.4 |

*)Given as residual content up to 100%

During the experiments, no measurements were made in respect of occurrence of HF or $SO_2$, both of which are irritating already at low contents. The table shows however, concerning portion no. 3, that $CaF_2$ is partially lost at temperatures close to 1300° C. No loss of $CaF_2$ has been noted concerning portions no. 1, 2, 4 and 5.

Natural fluorspar normally used in the melting shop, has the following approximate composition (% by weight):

TABLE 4

Composition of natural fluorspar

| PORTION | $CaF_2$ | $SiO_2$ | $CaCO_3$ | MgO | $Fe_2O_3$ | S | $K_2O$ | Pb | P |
|---|---|---|---|---|---|---|---|---|---|
| Fluorspar | ≧90 | 7.5-8 | ≦0.5 | ~0.05 | ~0.2 | ~0.03 | ~0.02 | ≦0.01 | ≦0.01 |

In principle, the calcined hydroxide sludge is a chemically produced synthetic fluorspar, although having a maintained content of metal oxides and a small surplus of calcium oxide. In the following, the product is called hydroflux. The subsequent experiments aimed at investigating the properties of the hydroflux as a fluxing agent. A secondary purpose was to investigate whether the metal oxides would be allowed to be reduced into the steel heat.

Nine heats of 6 tons each and being of a stainless steel of the type ASTM 304 were produced in an arc furnace, for the pilot experiments. The respective heats were tapped into a heated tapping ladle, and were transported to a 6 ton AOD-converter for decarburization. The amount of slag accompanying from the arc furnace, was minimised. Before the experiments, the AOD-converter in question was provided with a new lining, in order thereby to be able to decide whether the hydroflux had an influence on the same.

The nine heats constituted test materials for an experimental campaign that was run in series in the AOD-converter. The experiments were conducted with varying mixing ratios of natural fluorspar and hydroflux. In five experiments, hydroflux from portions no. 4 and 5 were used, since this hydroflux had lower sulphur content, but two experiments with hydroflux from portion no. 3 were also included in the experimental campaign. Two reference heats with solely natural fluorspar were run. In order to reduce the metal oxides, primarily $Cr_2O_3$ but also $Fe_2O_3$, and NiO, it was found that an extra addition of FeSi was needed. The amount of FeSi required for the metal reduction is proportional to the metal oxides in the hydroflux. Moreover, an extra addition of CaO is required to maintain the basicity of the slag, which should be about 1.5-2.0. These extra additives result in that the amount of slag increases with up to 10%.

In the pickling, different types of steel result in different amounts of metal hydroxides in the sludge. One advantage of the invention is that you are not bound to use hydroxide sludge from the pickling of the same or essentially the same type of steel as the one you intend to produce. Therefore, the skilled person will realise that the invention is very easy to integrate in the existing steel production process. Thanks to the invention, it is also possible to handle already dumped hydroxide sludge, converting it to a valuable fluxing agent, and recovering its metal content.

The mixing ratios of the respective heats of the pilot experiment campaign are given in the table below. The numbers in parenthesis relate to the portion in question of the hydroflux:

TABLE 5

Mixing ratio of natural fluorspar and hydroflux

| Heat no. | $CaF_2$ from natural fluorspar | $CaF_2$ from hydroflux |
|---|---|---|
| 1 | 100 | 0 |
| 2 | 50 | 50 (4 + 5) |
| 3 | 50 | 50 (4 + 5) |
| 4 | 60 | 40 (4 + 5) |
| 5 | 50 | 50 (4 + 5) |
| 6 | 25 | 75 (4 + 5) |
| 7 | 65 | 35 (3) |
| 8 | 100 | 0 |
| 9 | 50 | 50 (3) |

The AOD-process may be described according to the following:
Charging of 6 tons of steel from a tapping ladle
Temperature measurement directly after charging
Lollipop and chill mould testing for analysis of carbon content and steel composition
Decarburization:
   Addition of lime and dolomite just after commenced oxygen blowing, guideline value C=0.40%
   Addition of lime, continued oxygen blowing and also nitrogen gas, guideline value C=0.15%
   Continued oxygen and nitrogen gas blowing, guideline value C=0.07%. Sampling for carbon content and temperature.
   Optional addition of cooling scrap. Sampling for carbon content and temperature.
Reduction:
   Addition of hydroflux, lime, FeSi, fluxing agents (natural fluorspar), SiMn, optionally cooling scrap. Argon gas blowing for stirring.
   Sampling of steel, slag and temperature
   Tapping In addition to the above described process steps, a continuous measurement of gas flows to the AOD-converter ($O_2$, $N_2$), exhaust gas flows from the AOD-converter (CO, $CO_2$, $O_2$), and material weight to different hoppers, took place. In order to investigate whether the use of hydroflux generates additional $Cr^{6+}$, the content of $Cr^{6+}$ was analysed in the water pool of a venturi scrubber in an exhaust emission control plant, see FIG. 2. The content was analysed after the respective experimental heats. The arrows indicate the reference heats with addition solely of natural fluorspar. From these measurements it is clear that the use of hydroflux does not give rise to increased $Cr^{6+}$ formation, compared to the use of natural fluorspar, which is seen in FIG. 2.

The slag samples from the 9 experimental heats were analysed and their compositions are given in the table below.

TABLE 6

Composition of slag samples from the 9 experimental heats

|  | AOD 1 | AOD 2 | AOD 3 | AOD 4 | AOD 5 | AOD 6 | AOD 7 | AOD 8 | AOD 9 |
|---|---|---|---|---|---|---|---|---|---|
| $Cr_2O_3$ | 5.0 | 3.6 | 1.1 | 1.0 | 0.2 | 0.2 | 0.3 | 0.4 | 0.1 |
| FeO | 0.4 | 0.6 | 1.3 | 0.3 | 0.2 | 0.3 | 0.4 | 0.6 | 0.3 |
| MgO | 3.7 | 4.3 | 7.4 | 10.6 | 9.1 | 8.6 | 10.3 | 10.2 | 10.1 |
| $SiO_2$ | 32.7 | 31.6 | 32.6 | 30.4 | 30.4 | 29.6 | 29.6 | 31.5 | 30.4 |
| CaO | 54.7 | 57.6 | 56.2 | 56.4 | 62.7 | 62.9 | 60.2 | 57.5 | 61.8 |
| F | 4.6 | 4.4 | 4.2 | 4.5 | 3.9 | 5.0 | 4.1 | 3.6 | 3.5 |
| $CaF_2$ | 9.5 | 9.0 | 8.6 | 9.2 | 8.0 | 10.2 | 8.4 | 7.4 | 7.2 |
| CaO calc | 47.9 | 51.1 | 50.2 | 49.8 | 56.9 | 55.5 | 54.2 | 52.2 | 56.6 |
| MnO | 1.2 | 0.9 | 0.4 | 0.4 | 0.1 | 0.1 | 0.1 | 0.2 | 0.1 |
| $Al_2O_3$ | 0.7 | 0.9 | 1.4 | 2.4 | 1.6 | 1.6 | 2.7 | 2.5 | 1.9 |
| $CaSO_4$ | <0.3 | <0.3 | <0.3 | <0.3 | <0.3 | <0.3 | 2.7 | <0.3 | 2.7 |
| Basicitet | 1.5 | 1.6 | 1.5 | 1.6 | 1.8 | 1.9 | 1.8 | 1.7 | 1.9 |

It is clear from the table that a few introductory experimental heats were required to find the optimum conditions for reduction of the chromium oxide. During these introductory experimental heats, the required amount of extra FeSi was found. Experimental heats no. 7 and 9 were produced with sulphuric containing hydroflux, and in these cases a small increase of the sulphur content in the slag could be noted. An analysis of the sulphur content of the steel indicates that sulphur is not re-introduced into the heat, and therefore one may assume that a small part of the sulphur ends up in the slag and the main part leaves with the exhaust gases as $SO_2$.

Experience from the conducted pilot experiments surprisingly shows that the hydroflux is also suitable for use as a fluxing agent in connection with carbon steel production. In connection with carbon steel production, the use of fluorspar has, as is well known, mainly been terminated. Instead, lime and iron oxide is used. The applicant would all the same point out the option of using hydroflux in these applications. In such a process, it is not necessary to reduce the metal oxides in the slag, why the extra addition of FeSi and CaO can be omitted. The purpose of $CaF_2$ in the hydroflux is also in this case to render the slag fluid.

As a conclusion, the pilot experiments have shown that:
Hydroxide sludge can be calcined into a mechanically stable product, suitable for use as a fluxing agent in an AOD-converter. No dusting has been observed.
The product, so called hydroflux, can be produced by a simple and cost-efficient method
The use of hydroflux has not shown any negative effects on the reduction process in the AOD-converter
The formation of slag by aid of hydroflux is equivalent with the one aided by natural fluorspar, and the slag has a good reactivity
The reduction slag in the AOD-converter had essentially the same properties independent of if hydroflux or natural fluorspar was used, among other things a low viscosity and the same colour.
The extra metal oxides in the hydroflux may be efficiently reintroduced into the heat by addition of FeSi.

No uptake of S and C in the heat could be observed at the use of hydroflux.

Full-Scale Experiments

Three sets of full scale experiments have been performed:
1. Initial test campaign. Screened, low sulphur hydroflux added to the AOD-converter in tilted position
2. $2^{nd}$ test campaign. Screened, high sulphur hydroflux added to the AOD-converter in upright position
3. $3^{rd}$ test campaign. Unscreened, high sulphur hydroflux added to the AOD-converter in upright position Initial Test Campaign For full scale experiments, four heats were produced in an arc furnace, each of about 90 tons in a sequence of a steel grade called ASTM 304L, i.e. of type ASTM 304 with low carbon content. By "sequence" is meant a production of several heats with the same steel code, after each other. The first heat of the sequence is an experimental heat, and the rest are reference heats. Routine samples of the steel's initial composition were taken from the arc furnace in the transfer ladle, before the de-slagged steel was discharged into an AOD-converter and the decarburization was commenced. After the decarburization with oxygen and argon in the AOD-converter, the reduction was commenced.

Hydroflux corresponding to about 40% of the required $CaF_2$ was added from a box that usually is used for cooling scrap. The hydroflux had a particle size of at least 12 mm, without any fines, and was well sintered and mechanically stable. The addition was made as a first step in the reduction, and with the AOD-converter in tilted position. Thereafter, the converter was raised to operating position, and the rest of the reduction mixture was added from the hoppers of alloying elements above the converter. The composition of the used hydroflux is shown in the table below.

TABLE 7

Composition of the hydroflux (% by weight) used in the initial campaign

| $CaF_2$ | 51 |
|---|---|
| $Fe_2O_3$ | 27 |
| $Cr_2O_3$ | 5 |
| NiO | 4 |
| $CaSO_4$ | 0.3 |
| $SiO_2$ | 2 |
| S | 0.06 |
| C | 0.01 |

In order to form a reducing slag, the following additions were made to the AOD-converter during the reduction step:

TABLE 8

Additives to the reduction step (kg)

| | Heat no. | | | |
|---|---|---|---|---|
| | Test heat | Reference 1 | Reference 2 | Reference 3 |
| FeSi, (Si, 75%) | 1302 | 1063 | 1653 | 1331 |
| FeSiMn | 1687 | 1702 | 1699 | 1412 |
| Burnt lime (CaO) | 1535 | 1375 | 2814 | 1752 |
| Fluorspar (CaF$_2$, 90%) | 750 | 983 | 1333 | 1140 |
| Hydroflux (CaF$_2$, 51%) | 780 | — | — | — |

The following amounts of steel (tons) have been charged into and discharged from the converter:

TABLE 9

Steel amounts in the AOD-converter (tons)

| | Test heat | Reference 1 | Reference 2 | Reference 3 |
|---|---|---|---|---|
| Initial Weight | 92.0 | 87 | 83 | 86.1 |
| Final Weight | 101.5 | 99.7 | 100.2 | 94.6 |

Results from the Production of the Four Sequence Heats

The production of the four sequence heats followed a normal course. Normal production samples and extra slag samples were taken from the reduction step. Corresponding samples were taken from the three reference heats. The analyses of the steel samples after reduction are shown in table 10. The slag samples from the reduction are shown in Table 11.

TABLE 10

Steel samples (ASTM 304L) from the AOD-converter after reduction

| Element | Test heat | Reference 1 | Reference 2 | Reference 3 |
|---|---|---|---|---|
| C | 0.015 | 0.013 | 0.016 | 0.017 |
| Si | 0.30 | 0.19 | 0.22 | 0.12 |
| Mn | 1.65 | 1.61 | 1.46 | 1.53 |
| P | 0.023 | 0.023 | 0.024 | 0.021 |
| S | 0.010 | 0.009 | 0.013 | 0.011 |
| Cr | 18.18 | 18.00 | 17.72 | 17.91 |
| Ni | 8.17 | 8.05 | 8.13 | 8.09 |
| Mo | 0.34 | 0.31 | 0.32 | 0.41 |
| Cu | 0.25 | 0.22 | 0.22 | 0.20 |
| N | 0.092 | 0.077 | 0.079 | 0.077 |

TABLE 11

Slag samples after reduction (% by weight)

| Element | Test heat | Reference 1 | Reference 2 | Reference 3 |
|---|---|---|---|---|
| SiO$_2$ | 35.4 | 35.6 | 37.2 | 36.7 |
| MnO | 1.2 | 1.2 | 2.4 | 1.4 |
| P$_2$O$_5$ | 0.0 | 0.0 | 0.0 | 0.0 |
| S | 0.04 | 0.03 | 0.01 | 0.05 |
| Cr$_2$O$_3$ | 1.0 | 1.1 | 2.1 | 1.3 |
| NiO | 0.05 | 0.04 | 0.04 | 0.04 |
| TiO$_2$ | 0.30 | 0.26 | 0.36 | 0.33 |
| Al$_2$O$_3$ | 1.6 | 1.0 | 0.8 | 1.4 |
| V$_2$O$_5$ | 0.01 | 0.01 | 0.02 | 0.02 |
| MgO | 5.2 | 6.1 | 5.3 | 5.6 |
| CaO | 55.7 | 55.8 | 52.7 | 54.9 |
| CaO, Calc. | 49.9 | 50.8 | 47.5 | 49.0 |
| FeO | 0.3 | 0.2 | 0.3 | 0.3 |
| CaF$_2$ | 8.1 | 6.9 | 7.1 | 7.4 |
| Basicity | 1.4 | 1.4 | 1.3 | 1.4 |

The addition of hydroflux in the initial campaign worked according to the expectations, and the observations can be summarised as follows:

No dusting or strong reaction took place at the addition of the hydroflux

The appearance of the slag was similar, and it was well fluid for all four heats The content of Cr$_2$O$_3$ in the reduction slag was equal in all heats No changing of properties for the ladle furnace slag were observed before tapping into the tundish in the continuous casting plant for the test heat in comparison with the reference heats.

Results of the Evaluation of the Final Material

The test heat and the reference heats have been compared in respect of the quality of the materials. 12 steel strips were made from the material, and the qualities of these were investigated according to the following:

Investigation of the weldability of the strips

Investigation of slag inclusions in the strips

Establishing strength values

Manual inspection of the surface quality in respect of surface defects

Comparison of Weldability

Comparative welding tests have been performed by certified welders according to a method called MMA/SMAW, using an electrode type called 308L/MVR AC/DC. No visual difference could be seen in respect of weldability, such as flow and slag release, when comparing test and reference heats.

Comparison of Slag Inclusions in the Materials

All together, 6 samples have been evaluated in respect of the occurrence of slag inclusions. 3 samples were taken from the test heat and 1 sample each was taken from the reference heats. The samples have been analysed in a PC controlled metal microscope at Avesta Research Centre (ARC) and according to regulation SS 111116, i.e. the method that the ARC uses for routine control of slag inclusions in stainless materials. All 6 samples show low occurrence of slag inclusions.

Strength Analysis and Manual Inspection of Surface Quality

The strength tests were approved for all 12 strips. The surface inspection revealed no deviations as compared to other strips produced during the same period in the strip mill in question.

2$^{nd}$ Test Campaign

Twenty-two heats in three sequences of the steel grades called ASTM 304L and ASTM 316L were produced. Seven reference heats were included in the sequence. A total of 19 tons of hydroflux was added to the heats in various amounts. 50-100% out of the total requirement of fluxing agent in each heat respectively was provided by addition of hydroflux which can be seen in table 13 below. Three reference heats were produced with natural fluorspar as the only fluxing agent. The hydroflux was added in a conventional manner to the AOD-converter in upright position from a hopper above the converter.

The hydroflux used was produced in a stationary electric furnace where the hydroxide sludge was dried and calcined/sintered at a final temperature of 1050° C. The hydroflux was screened to a particle size above 4 mm. The hydroxide sludge used originated from four different neutralisation plants that was mixed. In this way the hydroflux produced obtained realistic variations in its compositions depending on that particular mixture. The composition of the hydroflux varied within the ranges shown in table 12 below.

TABLE 12

Variations in the composition of the used hydroflux (% by weight) in the test campaign

| | |
|---|---|
| $CaF_2$ | 40-60 |
| $Fe_2O_3$ | 22-30 |
| $Cr_2O_3$ | 5-8 |
| NiO | 3-5 |
| CaO | 2-20 |
| $SiO_2$ | 1.5-2 |
| $CaSO_4$ | 0.5-14 |
| C | 0.01-0.02 |

TABLE 13

Additives (kg) to the heats in the test campaign

| Steel grade | Heat no. | $CaF_2$ kg | CaO kg | 75 FeSi | FeSiMn | Hydroflux |
|---|---|---|---|---|---|---|
| 2323 | 844117 | 1006 | 856 | 1723 | 0 | 0 |
| 2323 | 844118 | 479 | 854 | 1610 | 0 | 1027 |
| 2323 | 844119 | 517 | 1704 | 2125 | 0 | 1040 |
| 2323 | 844120 | 502 | 1760 | 2216 | 0 | 1047 |
| 2323 | 844121 | 516 | 1552 | 2200 | 0 | 1043 |
| 2323 | 844122 | 1002 | 1697 | 2051 | 0 | 0 |
| 1358 | 844123 | 1021 | 1118 | 1175 | 1402 | 0 |
| 1358 | 844124 | 521 | 1321 | 1332 | 1354 | 1037 |
| 1358 | 844125 | 523 | 937 | 1302 | 1227 | 1027 |
| 1358 | 844126 | 214 | 1509 | 1381 | 1321 | 1530 |
| 1358 | 844127 | 208 | 1405 | 1218 | 1243 | 1520 |
| 1358 | 844128 | 0 | 2500 | 1556 | 1122 | 2017 |
| 1358 | 844129 | 0 | 946 | 1071 | 1335 | 1832 |
| 1358 | 844130 | 986 | 1252 | 1297 | 1252 | 0 |
| 2323 | 844167 | 258 | 1859 | 2324 | 0 | 1515 |
| 2323 | 844168 | 262 | 1168 | 2027 | 0 | 1448 |
| 2323 | 844169 | 981 | 1083 | 1786 | 0 | 0 |
| 1358 | 844172 | 1219 | 2766 | 1467 | 1054 | 0 |
| 1358 | 844173 | 631 | 2032 | 1469 | 1362 | 820 |
| 1358 | 844174 | 535 | 2105 | 1100 | 1478 | 1200 |
| 1358 | 844175 | 547 | 1300 | 901 | 1736 | 994 |
| 1358 | 844176 | 965 | 766 | 826 | 1887 | 0 |

Results from the Production of the Nineteen Sequence Heats

The production of the nineteen sequence heats followed a normal course. Normal production samples and extra slag samples were taken from the reduction step. Corresponding samples were taken from the seven reference heats. The analyses of the steel samples after reduction are shown in table 14, 16 and 18 and the slag samples from the reduction are shown in Table 15, 17 and 19.

TABLE 14

Steel samples (ASTM 316L) from the AOD-converter after reduction

| | Heat | | | | | | | | |
|---|---|---|---|---|---|---|---|---|---|
| Element | 844117 REF 4 | 844118 Test 2 | 8488119 Test 3 | 844120 Test 4 | 844121 Test 5 | 844122 REF 5 | 844167 Test 6 | 844168 Test 7 | 844169 REF 6 |
| C | 0.019 | 0.015 | 0.014 | 0.016 | 0.012 | 0.013 | 0.011 | 0.012 | 0.012 |
| Si | 0.40 | 0.47 | 0.55 | 0.43 | 0.35 | 0.39 | 0.42 | 0.43 | 0.46 |
| Mn | 0.91 | 0.84 | 0.85 | 0.84 | 0.97 | 0.93 | 1.03 | 0.99 | 0.89 |
| P | 0.026 | 0.023 | 0.024 | 0.024 | 0.027 | 0.026 | 0.026 | 0.026 | 0.026 |
| S | 0.007 | 0.006 | 0.008 | 0.009 | 0.012 | 0.008 | 0.005*) | 0.007*) | 0.004 |
| Cr | 16.92 | 16.72 | 16.66 | 16.64 | 16.89 | 16.70 | 16.73 | 16.84 | 16.92 |
| Ni | 10.15 | 10.16 | 10.19 | 10.16 | 10.36 | 10.16 | 10.09 | 10.12 | 10.06 |
| Mo | 1.94 | 2.00 | 2.04 | 2.00 | 2.10 | 2.03 | 2.18 | 2.00 | 1.96 |
| Cu | 0.45 | 0.33 | 0.33 | 0.34 | 0.42 | 0.44 | 0.34 | 0.37 | 0.35 |
| N | 0.053 | 0.039 | 0.052 | 0.058 | 0.053 | 0.053 | 0.040 | 0.055 | 0.053 |

*)≈75% out of the total requirement of fluxing agent added as hydroflux with 4-6% $CaSO_4$ doesn't effect the sulphur content in the steel The hydroflux was added in connection to the reduction step. In order to evaluate the efficiency of the fluxing agent the amounts of $Cr_2O_3$ remaining in the slag was measured. A well working reduction produces a slag where the amount of $Cr_2O_3$ remaining in the slag is max. 1.0%.

TABLE 15

Slag samples after reduction ASTM 316L (% by weight)

| Element | 844117 REF 4 | 844118 Test 2 | 8488119 Test 3 | 844120 Test 4 | 844121 Test 5 | 844122 REF 5 | 844167 Test 6 | 844168 Test 7 | 844169 REF 6 |
|---|---|---|---|---|---|---|---|---|---|
| S | 0.20 | 0.15 | 0.13 | 0.11 | 0.13 | 0.16 | 0.13 | 0.14 | 0.12 |
| F | 4.4 | 3.6 | 4.5 | 3.8 | 4.1 | 4.2 | 4.3 | 3.9 | 5.1 |
| MnO | 0.2 | 0.2 | 0.2 | 0.3 | 0.3 | 0.2 | 0.3 | 0.4 | 0.2 |
| P2O5 | 0 | 0 | 0 | 0 | 0 | 0 | 0 | 0 | 0 |
| Cr2O3 | 0.7 | 0.5 | 0.7 | 0.6 | 0.5 | 0.5 | 0.4 | 0.4 | 0.3 |
| NiO | 0.04 | 0.04 | 0.04 | 0.05 | 0.04 | 0.04 | 0.04 | 0.04 | 0.05 |
| TiO2 | 0.33 | 0.22 | 0.17 | 0.19 | 0.18 | 0.27 | 0.19 | 0.28 | 0.25 |
| V2O5 | 0.01 | 0.01 | 0.02 | 0.01 | 0.02 | 0.03 | 0.02 | 0.01 | 0.01 |
| Al2O3 | 1.7 | 1.2 | 1.2 | 1.2 | 1.2 | 1.3 | 1.0 | 1.1 | 1.1 |
| CaF2 | 9.1 | 7.3 | 9.1 | 7.7 | 8.4 | 8.5 | 8.7 | 8.0 | 10.5 |
| CaO | 59.5 | 58.1 | 59.0 | 58.5 | 57.6 | 58.7 | 59.0 | 57.4 | 59.2 |
| CaO ber | 53.0 | 52.8 | 52.4 | 53.0 | 51.6 | 52.6 | 52.7 | 51.6 | 51.7 |
| FeO | 0.1 | 0.1 | 0.2 | 0.2 | 0.2 | 0.1 | 0.2 | 0.7 | 0.3 |
| MgO | 5.8 | 6.4 | 5.3 | 5.1 | 5.6 | 5.6 | 7.6 | 6.4 | 6.6 |
| Basicity | 1.6 | 1.5 | 1.6 | 1.5 | 1.6 | 1.6 | 1.6 | 1.5 | 1.6 |

TABLE 16

Steel samples (ASTM 304L) from the AOD-converter after reduction

| Element | 844123 REF 7 | 844124 Test 8 | 844125 Test 9 | 844126 Test 10 | 844127 Test 11 | 844128 Test 12 | 844129 Test 13 | 844130 REF 8 |
|---|---|---|---|---|---|---|---|---|
| C | 0.020 | 0.015 | 0.015 | 0.015 | 0.013 | 0.020 | 0.010 | 0.015 |
| Si | 0.36 | 0.19 | 0.26 | 0.28 | 0.26 | 0.27 | 0.21 | 0.20 |
| Mn | 1.62 | 1.67 | 1.66 | 1.68 | 1.68 | 1.57 | 1.65 | 1.67 |
| P | 0.023 | 0.027 | 0.029 | 0.029 | 0.029 | 0.028 | 0.029 | 0.026 |
| S | 0.006 | 0.006 | 0.011 | 0.007 | 0.006 | 0.015*) | 0.011*) | 0.010 |
| Cr | 17.88 | 17.85 | 17.95 | 18.08 | 17.97 | 17.77 | 17.86 | 18.00 |
| Ni | 8.17 | 8.08 | 8.09 | 8.09 | 8.05 | 8.09 | 8.03 | 8.05 |
| Mo | 0.36 | 0.36 | 0.38 | 0.37 | 0.42 | 0.37 | 0.36 | 0.36 |
| Cu | 0.18 | 0.20 | 0.33 | 0.30 | 0.30 | 0.30 | 0.31 | 0.29 |
| N | 0.079 | 0.073 | 0.085 | 0.079 | 0.074 | 0.068 | 0.083 | 0.081 |

*)100% out of the total requirement of fluxing agent added as hydroflux with 4-6% $CaSO_4$ has a marginal effect on the sulphur content in the steel

TABLE 17

Slag samples after reduction ASTM 304L (% by weight)

| Element | 844123 REF 4 | 844124 Test 2 | 8488125 Test 3 | 844126 Test 4 | 844127 Test 5 | 844128 REF 5 | 844129 Test 6 | 844130 Test 7 |
|---|---|---|---|---|---|---|---|---|
| S | 0.070 | 0.10 | 0.27 | 0.28 | 0.23 | 0.04 | 0.17 | 0.13 |
| F | 4.4 | 4.3 | 4.9 | 5.5 | 5.3 | 4.1 | 4.1 | 3.4 |
| SiO2 | 33.2 | 33.2 | 32.5 | 31.9 | 31.6 | 34.3 | 32.3 | 34.3 |
| MnO | 0.4 | 0.5 | 0.5 | 0.3 | 0.3 | 1.1 | 0.6 | 0.6 |
| P2O5 | 0 | 0 | 0 | 0 | 0 | 0 | 0 | 0 |
| Cr2O3 | 0.4 | 0.4 | 0.3 | 0.2 | 0.2 | 1.0 | 0.4 | 0.5 |
| NiO | 0.04 | 0.04 | 0.04 | 0.04 | 0.04 | 0.04 | 0.04 | 0.04 |
| TiO2 | 0.37 | 0.24 | 0.23 | 0.25 | 0.27 | 0.30 | 0.26 | 0.30 |
| V2O5 | 0.01 | 0.01 | 0.01 | 0.01 | 0.01 | 0.02 | 0.01 | 0.01 |
| Al2O3 | 0.9 | 0.9 | 0.9 | 1.0 | 1.0 | 1.1 | 0.9 | 1.1 |
| CaF2 | 9.0 | 8.7 | 10.0 | 11.3 | 10.9 | 8.4 | 8.3 | 6.9 |
| CaO | 58.2 | 57.7 | 57.5 | 58.8 | 58.8 | 54.8 | 58.4 | 57.2 |
| CaO calc | 51.7 | 51.4 | 50.3 | 50.7 | 51.0 | 48.8 | 52.4 | 52.2 |
| FeO | 0.1 | 0.1 | 0.2 | 0.1 | 0.1 | 0.4 | 0.2 | 0.1 |

TABLE 17-continued

Slag samples after reduction ASTM 304L (% by weight)

| Element | Heat 844123 REF 4 | 844124 Test 2 | 8488125 Test 3 | 844126 Test 4 | 844127 Test 5 | 844128 REF 5 | 844129 Test 6 | 844130 Test 7 |
|---|---|---|---|---|---|---|---|---|
| MgO | 6.7 | 7.3 | 7.7 | 7.6 | 8.3 | 6.4 | 7.9 | 6.5 |
| Basicity | 1.6 | 1.5 | 1.5 | 1.6 | 1.6 | 1.4 | 1.6 | 1.5 |

TABLE 18

Steel samples (ASTM 304L) from the AOD-converter after reduction

| Element | Heat 844172 REF 9 | 844173 Test 14 | 844174 Test 15 | 844175 Test 16 | 844176 REF 10 |
|---|---|---|---|---|---|
| C | 0.012 | 0.013 | 0.014 | 0.016 | 0.014 |
| Si | 0.17 | 0.18 | 0.19 | 0.15 | 0.27 |
| Mn | 1.57 | 1.59 | 1.64 | 1.66 | 1.65 |
| P | 0.025 | 0.028 | 0.025 | 0.023 | 0.023 |
| S | 0.008 | 0.015*) | 0.020*) | 0.015*) | 0.011 |
| Cr | 17.83 | 17.97 | 17.95 | 18.11 | 18.04 |
| Ni | 8.14 | 8.00 | 8.10 | 8.15 | 8.12 |
| Mo | 0.58 | 0.32 | 0.37 | 0.34 | 0.37 |
| Cu | 0.32 | 0.29 | 0.34 | 0.32 | 0.32 |
| N | 0.069 | 0.070 | 0.070 | 0.085 | 0.069 |

*)45-56% out of the total requirement of fluxing agent added as hydroflux with 12-14% $CaSO_4$ has a marginal effect on the sulphur content in the steel

TABLE 19

Slag samples after reduction ASTM 304L (% by weight)

| Element | Heat 844172 REF 9 | 844173 Test 14 | 844174 Test 15 | 844175 Test 16 | 844176 REF 10 |
|---|---|---|---|---|---|
| S | 0.070 | 0.10 | 0.27 | 0.28 | 0.23 |
| F | 4.4 | 4.3 | 4.9 | 5.5 | 5.3 |
| SiO2 | 33.2 | 33.2 | 32.5 | 31.9 | 31.6 |
| MnO | 0.4 | 0.5 | 0.5 | 0.3 | 0.3 |
| P2O5 | 0 | 0 | 0 | 0 | 0 |
| Cr2O3 | 0.4 | 0.4 | 0.3 | 0.2 | 0.2 |
| NiO | 0.04 | 0.04 | 0.04 | 0.04 | 0.04 |
| TiO2 | 0.37 | 0.24 | 0.23 | 0.25 | 0.27 |
| V2O5 | 0.01 | 0.01 | 0.01 | 0.01 | 0.01 |
| Al2O3 | 0.9 | 0.9 | 0.9 | 1.0 | 1.0 |
| CaF2 | 9.0 | 8.7 | 10.0 | 11.3 | 10.9 |
| CaO | 58.2 | 57.7 | 57.5 | 58.8 | 58.8 |
| CaO calc | 51.7 | 51.4 | 50.3 | 50.7 | 51.0 |
| FeO | 0.1 | 0.1 | 0.2 | 0.1 | 0.1 |
| MgO | 6.7 | 7.3 | 7.7 | 7.6 | 8.3 |
| Basicity | 1.6 | 1.5 | 1.5 | 1.6 | 1.6 |

Given the experiments performed hitherto, it seems that sulphur in the hydroflux does not significantly affect the steel production process. The main part of the sulphur leaves together with the effluent gas from the AOD-converter as $SO_2$.

The addition of hydroflux in the $2^{nd}$ test campaign worked according to the expectations, and the observations can be summarised as follows:

The hydroflux could be transported to the hoppers without any negative influence on the mechanical properties The addition of hydroflux from the hoppers worked without any problems No dusting took place at the addition of the hydroflux The appearance of the slag was similar, and it was well fluid for all heats Variations within the content of $CaF_2$ didn't effect on the properties of the slag The content of $Cr_2O_3$ in the reduction slag was equally low in all heats The basicity of the slag where the same (1.4-1.6) for all heats Natural fluorspar could be completely substituted to hydroflux without any negative effects Hydroflux with 14% $CaSO_4$ did not effect the sulphur content in the steel Hydroflux gave a somewhat more fluid slag than natural fluorspar No changing of properties for the ladle furnace slag were observed before tapping into tundish in the continuous casting plant $3^{rd}$ Test Campaign Unscreened, high sulphur hydroflux added to the AOD-converter in upright position. Nine heats in a sequence of the steel grades called ASTM 304L were produced. Three reference heats were included with natural fluorspar as the only fluxing agent. A total of 7 tons of unscreened, high sulphur hydroflux was added into the six test heats in amounts of 50-75% out of the total requirement of fluxing agent in each heat respectively. The hydroflux was added in a conventional manner to the AOD-converter in upright position from a hopper above the converter. The hydroflux contained approximately 20% fines with particle sizes smaller than 4 mm. The composition of the hydroflux varied within the ranges shown in table 20 below.

TABLE 20

Variations in the composition of the used hydroflux (% by weight) in the test campaign

| $CaF_2$ | 45-60 |
|---|---|
| $Fe_2O_3$ | 24-30 |
| $Cr_2O_3$ | 5-9 |
| NiO | 3-5 |
| CaO | 2-24 |
| $SiO_2$ | 1.5-2 |
| $CaSO_4$ | 5-7 |
| C | 0.01-0.02 |

In order to form a reducing slag, the following additions were made to the AOD-converter during the reduction step in the campaign:

TABLE 21

Additives (kg) to the heats in the test campaign

| Steel grade | Heat no | $CaF_2$ kg | CaO kg | 75 FeSi | FeSiMn | Hydroflux |
|---|---|---|---|---|---|---|
| 1358 | 451132 | 1000 | 800 | 850 | 1380 | 0 |
| 1358 | 451133 | 274 | 1492 | 1304 | 1518 | 1069 |
| 1358 | 451134 | 622 | 809 | 863 | 1387 | 1045 |
| 1358 | 451135 | 614 | 722 | 1196 | 1223 | 1060 |

TABLE 21-continued

Additives (kg) to the heats in the test campaign

| Steel grade | Heat no | CaF$_2$ kg | CaO kg | 75 FeSi | FeSiMn | Hydroflux |
|---|---|---|---|---|---|---|
| 1358 | 451136 | 1022 | 815 | 1029 | 1261 | 0 |
| 1358 | 451137 | 522 | 1361 | 1294 | 1396 | 1069 |
| 1358 | 451138 | 363 | 1557 | 1379 | 1520 | 1547 |
| 1358 | 451139 | 372 | 1482 | 1460 | 1276 | 1541 |
| 1358 | 451140 | 1027 | 1936 | 1574 | 1149 | 0 |

TABLE 22

Steel samples (ASTM 304L) from the AOD-converter after reduction

| | Heat | | | | | | | | |
|---|---|---|---|---|---|---|---|---|---|
| Element | 451132 REF 11 | 851133 Test 17 | 851134 Test 18 | 851135 Test 19 | 851136 REF 12 | 851137 Test 20 | 851138 Test 21 | 851139 Test 22 | 851140 REF 13 |
| C | 0.012 | 0.013 | 0.014 | 0.016 | 0.014 | 0.018 | 0.018 | 0.017 | 0.016 |
| Si | 0.17 | 0.18 | 0.19 | 0.15 | 0.27 | 0.39 | 0.14 | 0.16 | 0.25 |
| Mn | 1.57 | 1.59 | 1.64 | 1.66 | 1.65 | 1.61 | 1.57 | 1.61 | 1.53 |
| P | 0.025 | 0.028 | 0.025 | 0.023 | 0.023 | 0.028 | 0.026 | 0.027 | 0.026 |
| S | 0.008 | 0.015*) | 0.020*) | 0.015*) | 0.011 | 0.008 | 0.012*) | 0.005 | 0.004 |
| Cr | 17.83 | 17.97 | 17.95 | 18.11 | 18.04 | 18.07 | 18.29 | 18.03 | 17.92 |
| Ni | 8.14 | 8.00 | 8.10 | 8.15 | 8.12 | 8.16 | 8.24 | 8.13 | 8.01 |
| Mo | 0.58 | 0.32 | 0.37 | 0.34 | 0.37 | 0.36 | 0.36 | 0.37 | 0.31 |
| Cu | 0.32 | 0.29 | 0.34 | 0.32 | 0.32 | 0.36 | 0.43 | 0.47 | 0.31 |
| N | 0.069 | 0.070 | 0.070 | 0.085 | 0.069 | 0.077 | 0.084 | 0.079 | 0.079 |

*)70% out of the total requirement of fluxing agent added as hydroflux with 5-7% CaSO$_4$ cause a small increase on the sulphur content in the steel

TABLE 23

Slag samples after reduction ASTM 304L (% by weight)

| | Heat | | | | | | | | |
|---|---|---|---|---|---|---|---|---|---|
| Element | 451132 REF 11 | 851133 Test 17 | 851134 Test 18 | 851135 Test 19 | 851136 REF 12 | 851137 Test 20 | 851138 Test 21 | 851139 Test 22 | 851140 REF 13 |
| S | 0.13 | 0.09 | 0.17 | 0.08 | 0.16 | 0.12 | 0.12 | 0.15 | 0.09 |
| F | 5.5 | 3.0 | 5.5 | 4.5 | 5.4 | 4.2 | 4.2 | 4.1 | 4.4 |
| SiO2 | 30.0 | 34.3 | 31.1 | 33.2 | 30.9 | 33.7 | 34.3 | 33.2 | 33.1 |
| MnO | 0.5 | 1.4 | 0.8 | 1.3 | 0.3 | 1.1 | 1.4 | 1.0 | 0.5 |
| P2O5 | 0 | 0 | 0 | 0 | 0 | 0 | 0 | 0 | 0 |
| Cr2O3 | 0.6 | 0.8 | 0.6 | 0.9 | 0.6 | 0.8 | 0.7 | 0.6 | 0.7 |
| NiO | 0.05 | 0.07 | 0.11 | 0.06 | 0.04 | 0.05 | 0.05 | 0.05 | 0.05 |
| TiO2 | 0.25 | 0.37 | 0.25 | 0.27 | 0.23 | 0.21 | 0.19 | 0.24 | 0.15 |
| V2O5 | 0.01 | 0.03 | 0.01 | 0.02 | 0.02 | 0.01 | 0.01 | 0.02 | 0.02 |
| Al2O3 | 1.1 | 1.4 | 1.1 | 1.2 | 1.2 | 1.2 | 1.1 | 1.1 | 1.2 |
| CaF2 | 11.3 | 6.2 | 11.3 | 9.1 | 11.1 | 8.7 | 8.6 | 8.4 | 9.1 |
| CaO | 59.5 | 55.7 | 56.8 | 54.6 | 61.1 | 57.2 | 56.2 | 56.0 | 58.8 |
| CaO calc | 51.4 | 48.7 | 48.7 | 48.1 | 53.1 | 50.9 | 50.0 | 49.9 | 52.3 |
| FeO | 0.4 | 0.7 | 1.3 | 0.6 | 0.1 | 0.4 | 0.4 | 0.6 | 0.3 |
| MgO | 9.2 | 7.1 | 7.5 | 7.8 | 7.6 | 6.7 | 6.5 | 7.1 | 6.9 |
| Basicity | 1.7 | 1.5 | 1.6 | 1.5 | 1.7 | 1.5 | 1.5 | 1.5 | 1.6 |

The experiments showed that fines with particle sizes of max 1-2 mm or less have a tendency to be caught by the mixing gas that is blown through the heat and these fines are transported and deposited in the gas cleaning plant which is undesired. Suitably the hydroflux is screened such that a hydroflux product with particle sizes of at least 2 mm is obtained. The fines fraction can be formed to briquettes whereby they can be used in the converter as well.

Results of the Evaluation of the Material Produced During 2$^{nd}$ and 3$^{rd}$ Campaign The test heats and the reference heats all have been compared in respect of weldability, surface quality, slag inclusions and strength according to the same procedure as in the initial full scale experiments. Not a single defect has been observed.

Alternative Embodiments

In a preferred embodiment of the invention, an electrically heated, stationary furnace (of bell-type) is used for the calcination of hydroxide sludge. Performed experiments have showed that this results in a product having very good properties in terms of mechanical stability, sintering degree and piece/particle size. However, the invention is not limited to this, but according to undertaken experiments, a Kaldo converter can also be used for the calcination. The person skilled in the art will realise that other types of equipments can be used too, for example a belt furnace, an electrical or LP-gas or oil-heated stationary or batch type furnace such as a tunnel kiln or a walking beam furnace, a CLU-, OBM- or LD-converter, enabling the production of a product having the desired properties.

In the pilot experiments, the hydroflux had a piece/particle size of between 12-40 mm. These experiments were conducted without any dusting tendencies of the hydroflux at the handling after calcination and at the recycling to the AOD-converter. In the pilot experiments, the hydroflux was added via a material hopper above the AOD-converter that was in an upright position. It is also possible to add the hydroflux after charging of the steel, while the converter is still in tilted position. In the full scale experiments, hydroflux of different particle sizes have been used. The experiments have shown that a hydroflux product according to the invention can be added to the AOD-converter in conventional manner, i.e. added from the material hoppers above the AOD-converter when the converter is in upright position. Suitably the hydroflux is screened such that a hydroflux product with particle sizes of at least 2 mm is obtained. The fines fraction can be formed to briquettes whereby they can be used in the converter as well.

The concept of the invention also comprises use of the hydroflux product in other applications in which natural fluorspar is used, e.g. in the slag purification that is performed directly before continuous casting in a ladle furnace. In such an application, it is conceivable to allow the hydroflux to have a particle size smaller than 10 mm, suitably smaller than 5 mm, preferably 2-4 mm, and to add it via a squirt, to the ladle furnace.

It is also realised that a calcined hydroflux that risks dusting or not to penetrate into the slag as is desired, can be packed in individual portions in order to allow handling and addition without said drawbacks.

In the experiments, the addition of the calcined hydroxide sludge has taken place in connection with a reduction step in an AOD-converter. The person skilled in the art will however realise that the invention is not limited thereto, but that the calcined hydroxide sludge can be used as a fluxing agent in connection with a decarburization and/or reduction step in some other equipment, such as a CLU-converter.

It is furthermore realised that the content of $CaF_2$ in the hydroflux can be varied because the product can be used as a supplement to natural fluorspar. In a preferred embodiment, the content of $CaF_2$ in the hydroflux is 40-65% by weight, but with the metal contaminated pickling agents occurring in various pickling plants as a starting point, it is likely that the content of $CaF_2$ will vary between 20 and 80% by weight.

According to a preferred embodiment, a hydroxide sludge is used that has a natural low content of sulphur, in the form of calcium sulphate. The sulphur content of a hydroxide sludge that has a natural low content of sulphur is less than 0.1%. The invention is however not limited to the use of essentially low sulphur containing hydroxide sludge. Hydroxide sludge containing amounts of sulphur, suitably less than 15%, e.g. in the form of calcium sulphates, can also be used, as demonstrated in the full scale tests. Such contents occur in hydroxide sludge from production in an annealing and pickling line containing both a neolyte pickling section and a mixed acid section and in hydroxide sludge existing in landfills of today. Given the experiments performed hitherto, it seems that sulphur does not significantly affect the steel production process, but a higher content >15% of calcium sulphates seem to result in a somewhat increased content of sulphur in the steel and the slag. The main part of the sulphur leaves together with the effluent gases, as $SO_2$.

The major part of the hydroxide sludge produced in a neutralisation plant of the applicant originates from pickling liquids from the acid retardation plant, SAR, from spent pickling baths, and from neutralised flushing water from the pickling baths. A minor amount, about 5-10%, originates from a chromium reduced electrolyte from a neolyte pickling step, which is a pre-pickling method especially designed for cold-rolled surfaces before pickling with mixed acid. The neolyte pickling step contains sodium sulphate ($Na_2SO_4$) as an electrolyte. In this neutralisation plant the filtering of hydroxide sludge is however performed in seasons, why it is possible to obtain a hydroxide sludge having low sulphur content. In the other neutralisation plants of the applicant, all pickling liquids are mixed before they are led to the neutralisation plant, which results in a higher sulphur content in the produced hydroxide sludge.

The invention claimed is:

1. A fluxing agent that can be used in production of steel, produced by a method that comprises:
   providing a hydroxide sludge resulting from neutralisation of metal-contaminated pickling liquid from a pickling step for a steel, said hydroxide sludge containing at least one fluoride-containing compound,
   heating said hydroxide sludge to a temperature from 1000° C. to 1300° C.,
   allowing the hydroxide sludge to cool to ambient temperature, and
   crushing the cooled hydroxide sludge,
   and wherein the fluxing agent contains (in % by weight):
   20-30 $Fe_2O_3$
   20-80 $CaF_2$
   4-10 $Cr_2O_3$
   1-4 NiO
   8-12 CaO
   1-3 $SiO_2$
   0.1-15 $CaSO_4$
   0.2-0.5 MnO
   0.4-0.6 MgO
   max 0.02 C.

2. A fluxing agent according to claim 1, containing 40-65% by weight of $CaF_2$.

3. A fluxing agent according to claim 1, containing residual oxides originating from metals in the metal-contaminated pickling liquid.

4. A fluxing agent according to claim 1, produced by a method in which the step of heating said hydroxide sludge comprises heating the hydroxide sludge to a temperature in the range 1000-1200° C., whereby the hydroxide sludge is sintered into a mechanically stable product.

5. A fluxing agent according to claim 1, produced by a method in which the step of heating said hydroxide sludge comprises heating the hydroxide sludge to a temperature at which the hydroxide sludge is sintered into a mechanically stable product.

6. A fluxing agent according to claim 1, produced by a method in which the step of heating the hydroxide sludge comprises heating the hydroxide sludge to a temperature above 1200° C., whereby the hydroxide sludge melts and subsequently solidifies on cooling to ambient temperature.

7. A fluxing agent according to claim 1, produced by a method in which the step of heating the hydroxide sludge comprises heating the hydroxide sludge to a temperature at which the hydroxide sludge melts, so that the molten hydroxide sludge subsequently solidifies on cooling to ambient temperature.

8. A method in connection with steel production, comprising producing a steel heat and decarburizing the steel heat, whereby a slag is formed on top of said steel heat, and adding a fluxing agent to said slag, said fluxing agent being produced by a method comprising:
   providing a hydroxide sludge resulting from neutralisation of metal-contaminated pickling liquid from a pickling step for a steel and containing at least one fluoride-containing compound,
   heating said hydroxide sludge to a temperature from 1000° C. to 1300° C., allowing the hydroxide sludge to cool to ambient temperature, and
crushing the cooled hydroxide sludge,
and wherein the fluxing agent contains (in % by weight):
20-30 $Fe_2O_3$
20-80 $CaF_2$
4-10 $Cr_2O_3$
1-4 NiO
8-12 CaO
1-3 $SiO_2$
0.1-15 $CaSO_4$
0.2-0.5 MnO
0.4-0.6 MgO
max 0.02 C.

9. A method according to claim 8, comprising adding said fluxing agent to the slag in an amount that partly or totally corresponds to the requirement of $CaF_2$.

10. A method according to claim 9, comprising adding said fluxing agent in an amount that corresponds to 30-70% of the requirement of $CaF_2$ in order to achieve a desired fluxing effect.

11. A method according to claim 9, comprising adding said fluxing agent preferably in an amount that corresponds to 50% of the requirement of $CaF_2$ in order to achieve a desired fluxing effect.

12. A method according to claim 9, wherein the decarburization is followed by a reduction step in which at least a part of the metal content in the fluxing agent is reduced and forced into the steel heat by an extra addition of FeSi.

13. A method in connection with steel production according to claim 12, wherein the reduction step comprises addition of CaO.

* * * * *